Figure 1:
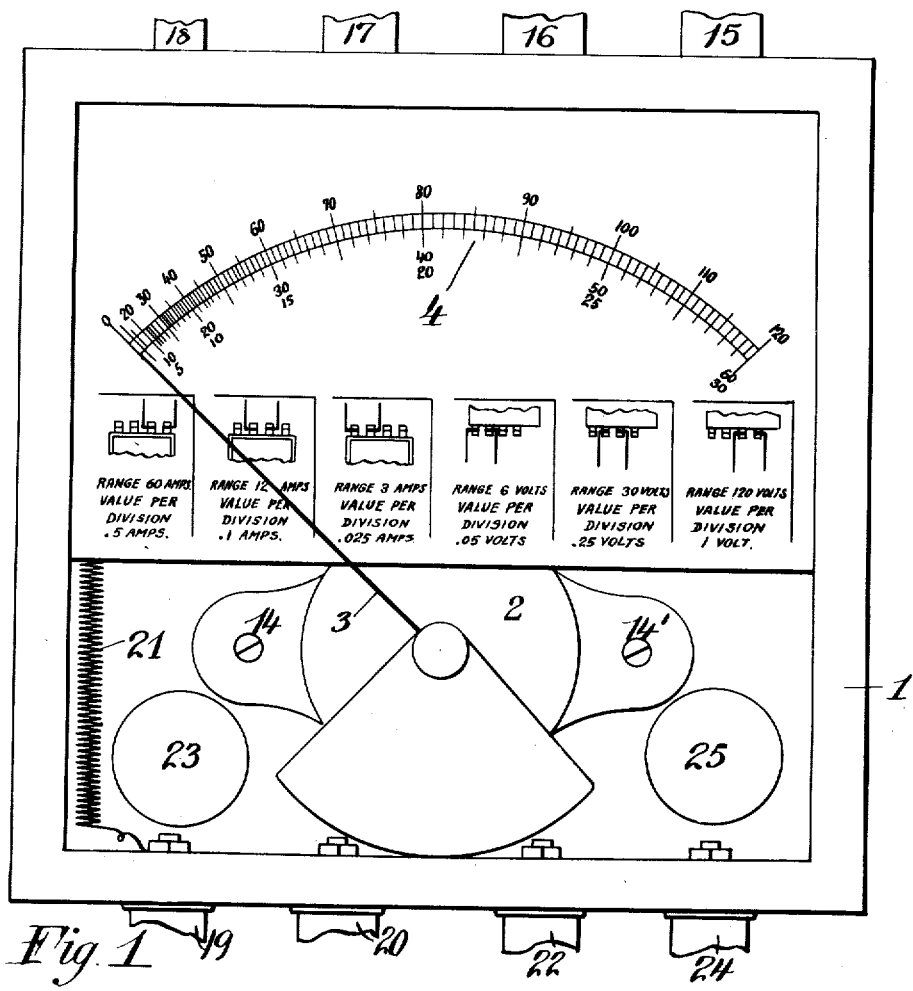

F. W. ROLLER.
ALTERNATING CURRENT MEASURING INSTRUMENT.
APPLICATION FILED JAN. 30, 1914.

1,126,286.

Patented Jan. 26, 1915.

2 SHEETS—SHEET 1.

Witnesses:
Joseph D. Connolly
Geo. N. Kerr

Frank W. Roller Inventor
By his Attorneys
Edwards, Sager & Wooster

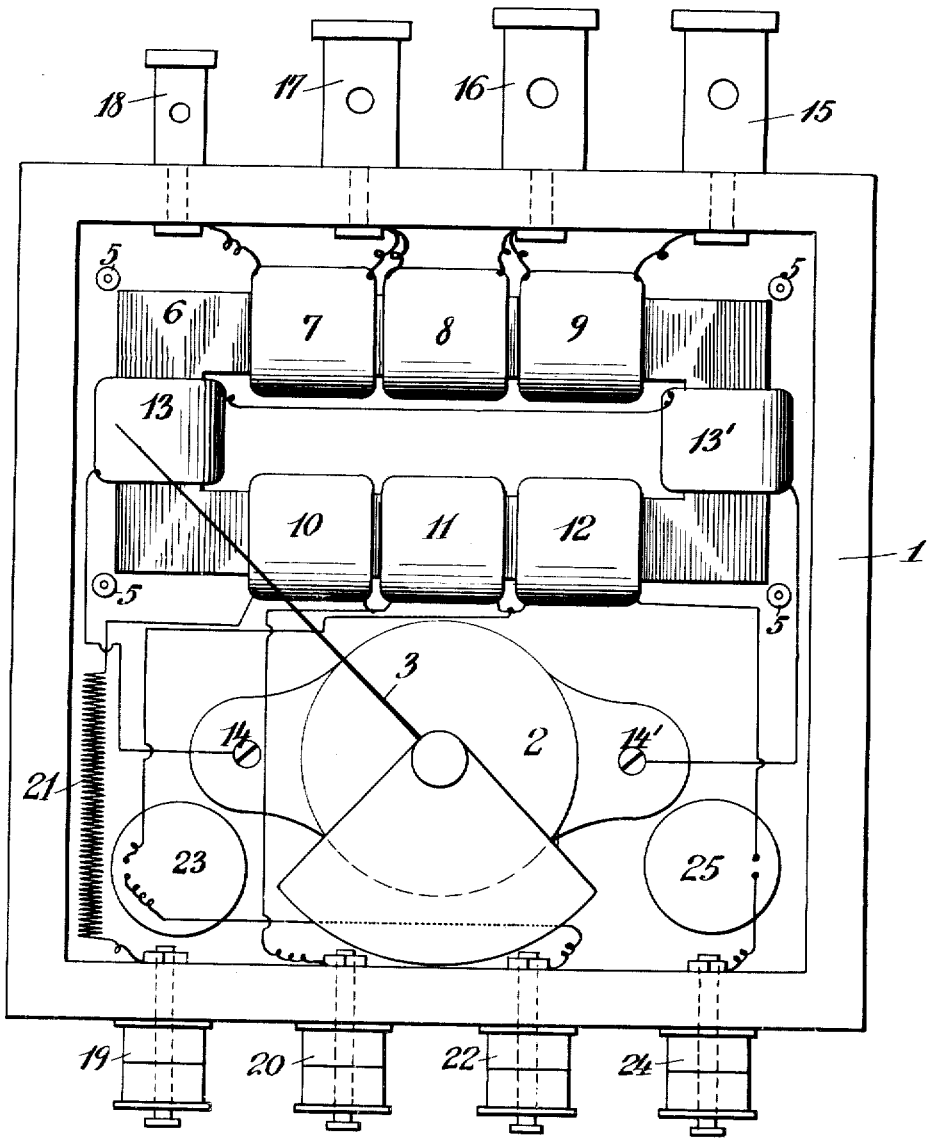

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ALTERNATING-CURRENT-MEASURING INSTRUMENT.

1,126,286.  Specification of Letters Patent.  Patented Jan. 26, 1915.

Application filed January 30, 1914. Serial No. 815,345.

*To all whom it may concern:*

Be it known that I, FRANK W. ROLLER, a citizen of the United States, residing at East Orange, in the county of Essex and State of New Jersey, have invented certain new and useful Improvements in Alternating-Current-Measuring Instruments, of which the following is a full, clear, and exact specification.

This invention relates to alternating current measuring instruments, and particularly to a type of instrument which shall be adapted for utilization in measuring current or voltages of largely different amounts and at the same time insure a wide range of deflection of the vane or other indicator with widely different quantities of current or voltages to which the instrument is adapted.

My invention also is adapted for the measurement of either currents or voltages or both with the same instrument.

One object of my invention is to provide an alternating current measuring instrument which shall be capable of use by connecting to certain terminals for measuring currents and also by connecting to certain other terminals to measure voltages while permitting the use of the same reading scale in either case without necessitating the use of inconvenient multiplying constants.

Another object is to adapt the instrument to the measurement of currents over a certain range which will permit the use of the full scale of the instrument for that range by connection to certain terminals, and by connection to certain other terminals adapt the instrument for measurement of currents over a much greater range while obtaining the full deflection of the instrument with the maximum amount of current over the increased range, and similarly by other connections to the instrument, adapt the instrument for measurement over a still greater range of current values than obtained by the other connections, and in each case without involving the use of inconvenient multiplying constants and at the same time permitting the use of the same reading scale.

A further object of my invention is to secure the same result by different connections to the instrument in the measurement of voltages through different ranges.

Further objects of my invention are to provide an instrument of the above character which shall be simple in construction, secure compactness and afford ready accessibility to all parts.

Other objects and advantages of my invention will be understood from the following description and accompanying drawings.

Figure 3:
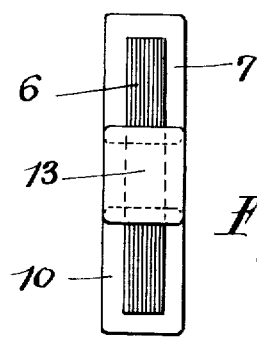

Figure 1 is a plan view of an instrument embodying my invention with the cover removed; Fig. 2 is a plan view of the instrument with the reading scale removed; and Fig. 3 is an end view of the transformer and coils thereon.

In accordance with my invention I utilize a transformer which is preferably included within the casing of the instrument and I connect the terminals of the secondary coil or coils to the controlling coil of the instrument itself so that they may remain in a closed circuit. Under this condition it follows that for obtaining the full deflection of the indicator of the instrument, the same through the secondary coil or coils of the transformer when the respective maximum currents flow through any of the primary coils. Consequently in adapting the instrument to the measurement of the currents over different ranges by different connections or to the measurement of different voltages by other different connections, the transformer must be so constructed and the relationship obtained by the primary windings when differently connected must be such that there exists the same number of ampere turns created by the primary windings when the full deflection of the indicator is obtained; but this would give correct results without affecting the calibration of the instrument and permit the use of the same scale in such case only under the condition that the magnetic leakage of the transformer under the different conditions of connection is in all cases the same or within such a negligible difference that whatever error occurred in the deflection of the indicator would be negligible. I provide a construction wherein the above requirements are fulfilled whether the primary windings be connected in different ways for measurement of current over different ranges, the transformer in such cases acting as a series transformer; or whether the primary windings be connected in different ways for obtaining voltage readings over different ranges, the transformer under such conditions acting as a potential transformer.

Referring to the drawings the casing is indicated at 1, which incloses all the parts when the glass cover, not shown, is in place. The actuating mechanism 2 of the instrument may be of any of the usual types such as in the well known movable coil form of volt meter or ammeter for deflecting the vane or indicator 3 and as the particular construction of this mechanism forms no part of the present invention, it need not be further described. The reading scale is indicated at 4 and in the present case the same scale is adapted to be used over a range for full scale deflections up to 3, 6, 12, 30, 60 and 120.

The scale plate is removably supported near the top of the casing on studs 5 and beneath the scale plate is located the transformer. This is made up of a laminated iron core 6 of rectangular shape having the long legs carrying primary coils 7, 8, 9, 10, 11, 12. The short ends of the core respectively carry the secondary coils 13, 13'. The secondary coils are connected in series with each other and in a closed circuit with the actuating coil or coils of the actuating mechanism 2, as indicated in Fig. 2 by connection of leads from the secondary coils to the terminals 14, 14' and the actuating mechanism.

It is of course apparent that the current delivered by the secondary coils 13, 13' to the actuating coil of the instrument is dependent upon the magnetic flux passed through the secondary coils. Consequently, in order to obtain a full scale deflection of the instrument when using different ones of the primary coils, there must in each case be created the same magnetic flux or change of flux through the secondary coils 13, 13'. If the primary windings, as connected in circuit under different conditions, are such as to produce the same number of ampere turns when the current corresponding to the desired full range deflection is passed through the primary windings, then, providing the total magnetic leakage affecting the secondary windings is maintained substantially the same in each case, the indicator of the instrument will be deflected to the maximum scale reading in each case. It also follows under this condition that for measurement of currents or voltages of a lesser amount than the full limit of the range for which the instrument is connected, the intermediate deflections will correspond proportionately with the amount of current or voltage to be measured, giving the same relative deflection and correct intermediate readings with all of the different connections of the primary windings, provided that the magnetic leakage is relatively the same for all intermediate currents or voltages under the different connections of the primary windings. I secure this result by providing an individual primary coil, corresponding to each desired different range of amperes, for connection to the external circuit when the current is to be measured, and by providing an individual coil, corresponding to each desired different range of voltages, for connection to the external circuit when the voltage is to be measured. I also so relatively locate the individual coil in each case that the magnetic leakage will be the same when the same ampere turns are created by each coil, not only for the maximum range corresponding to each coil, but for all intermediate lesser values respectively.

Thus referring to Fig. 2 the coil 9 is connected between binding posts 15, 16 and by these posts is adapted to be connected in series in the circuit in which the current is to be measured. It is formed of a few turns of wire of comparatively large size and adapted to carry a comparatively large current. The coil may be made up of say four turns of wire and adapted to give a full scale deflection of the instrument when say 60 amperes are passed through the coil, the value per division of the scale in such case being .5 ampere. It will be noted that the location of coil 9 on the transformer core relatively to the secondary coils 13, 13' is such that the magnetic leakage between the coil 9 and coil 13' is relatively small while that between the coil 9 and the coil 13 is relatively large. Now consider coil 8 which is connected between binding posts 16 and 17 and by which the coil 8 is adapted to be connected in series in the circuit in which the current is to be measured. Assume that it is desired to obtain a full deflection of the indicator when say 12 amperes are passed through the coil 8, then in order to have the maximum deflection with 12 amperes the same as obtained by passing 60 amperes through coil 9, the number of turns in coil 8 must be five times the number in coil 9 or 20 turns, under the above assumption that four turns were provided in coil 9. If the full range obtained by use of the coil 8 is 12 amperes, the value per division of the scale will then be .1 ampere. But in order to secure accurate results with this provision of ampere turns the magnetic leakage of the transformer affecting the secondary coils when the coil 8 is used must be the same as that existing when the coil 9 is used for not only the maximum ampere turns, but for all corresponding ampere turns of each of the two coils 8, 9. This result is secured in the construction disclosed because I have found by experiment that although the magnetic leakage between coils 8 and 13' is greater than that between coils 9 and 13' by reason of their different positions relatively to coil 13', yet the magnetic leakage between coil 8 and coil 13 is less than that between coil 9 and 13 and in practice the resultant magnetic leakage between each coil 8 and 9 relatively to the two coils 13 and 13' is substantially the same, and this is true not only for the maximum range of ampere turns, but for all corresponding values less than the maximum.

Coil 7 is connected between binding posts 17 and 18 and is provided with a different number of turns from either coil 8 or 9 and is adapted for use in the measurement of current over a different range of amperes while utilizing the full deflection of the indicator for the maximum value of the range for which it is adapted. Thus if it be desired that the full deflection shall be obtained with a value of three amperes, then the number of turns in coil 7 should be 80 to correspond with the above assumptions and the value per unit of scale division will then be .025 ampere. From the above explanations it will be understood that the coil 7 has the same resultant magnetic leakage relatively to coils 13, 13' as do the coils 8, 9 for all corresponding values of ampere turns. Thus when either coil 7, 8 or 9 is used, the maximum deflection of the instrument may be obtained at the maximum value of the range for which each is respectively adapted and the same scale may be used in each case.

The primary coils 10, 11 and 12 are adapted to be individually connected across alternating current circuits for measurement of voltages. The coil 10 is connected between binding posts 19 and 20 in series with a resistance 21. Suppose this coil be adapted to give a range of measurement of six volts and that the maximum reading is to be obtained when the voltage of the circuit across which coil 10 is connected by means of the binding posts 19 and 20 is six volts; then the number of ampere turns of coil 10 for the full deflection of the indicator of the instrument must be the same as the ampere turns of each of the current coils 7, 8 or 9 when the full deflection of the indicator was caused by each of said coils. The desired maximum number of ampere turns for coil 10 for the maximum range of six volts is obtained by providing a convenient number of turns in coil 10 and by insertion of such amount of resistance 21 in series with the coil, as will limit the current flow with six volts applied, to the proper amount. From the above explanations it will be understood that the resultant magnetic leakage between coil 10 and coils 13 and 13' will be the same as that existing with each of the coils 7, 8 and 9 for all corresponding values of ampere turns. With a full range deflection of six volts the value per unit division of the scale will in this case be .05 volt.

The coil 11 is connected between binding posts 20 and 22 in series with a resistance 23 indicated as being wound upon a spool. If it be desired that the voltage range secured by the use of this coil when the terminals 20 and 22 are connected across a circuit be thirty volts, the procedure is the same as in the case of coil 10, that is to say, a convenient number of turns, usually the same as the number employed for coil 10, is provided and an auxiliary resistance 23 connected in series therewith, so chosen in value as to limit the ampere turns with thirty volts applied to terminals 20, 22, to the same value as that through coil 10 with six volts applied to terminals 19, 20. Similarly the coil 12 may be adapted for a different range and if the range desired be 120 volts the number of turns of this coil may be the same as the number of turns in coil 10 with suitably adjusted resistance in series with it for securing the same number of ampere turns as in each of the other primary coils when the full scale deflection is obtained. This coil is indicated as having in series therewith between the terminals 22 and 24, the resistance 25 in addition to resistance 23.

In practice the scale will be marked as indicated in Fig. 1 for simplicity in quickly reading the amperes or voltages according to the particular range or nature of use of the instrument and a diagram of connections with suitable explanations may be shown on the scale plate as indicated in Fig. 1, which will show at a glance the range and value per scale division and whether for current or voltage measurement, as well as the proper connection for each case.

It will be understood from the above description and explanations that my invention fulfils the objects above referred to as well as other objects and advantages which will be understood by those skilled in the art, and I have found by actual construction and tests that an instrument of the above character is accurate within commercially negligible errors when used with the different coils as above described for different ranges of amperes as well as for different ranges of voltages.

Although I have disclosed one embodiment of my invention, it will be understood that various modifications thereof may be made without departing from the scope of the invention, and that by providing suitable windings in accordance with the above explanations the range of readings for any particular coil may be made as desired; also by providing additional windings an increased number of ranges may be obtained either for measurement of currents or of voltages.

Having thus described my invention, what I declare as new and desire to secure by Letters Patent of the United States is:—

1. The combination with the actuating mechanism of an electrical measuring instrument, of a transformer having its secondary winding connected in circuit with an actuating element of said mechanism, a primary current coil on said transformer adapted to be connected in circuit for current measurements, and a primary potential coil on said transformer adapted to be connected to a circuit for voltage measurements.

2. The combination with the actuating mechanism of an electrical measuring instrument, of a transformer, a secondary winding of said transformer being connected in circuit with an actuating element of said mechanism, and a plurality of individual primary coils on said transformer at least one of said primary coils being a current coil adapted to be connected in series in a circuit for measurement of current and at least one of said primary coils being a potential coil adapted to be connected across a circuit for measurement of voltages.

3. The combination with the actuating mechanism of an electrical measuring instrument, of a transformer, a secondary winding of said transformer being connected in circuit with an actuating element of said mechanism, and a plurality of individual primary coils on said transformer at least one of said primary coils being a current coil adapted to be connected in series in a circuit for measurement of current and at least one of said primary coils being a potential coil adapted to be connected across a circuit for measurement of voltages, said current and potential coils having the same ampere turns when the maximum current and maximum voltage for which the coils are respectively adapted are subjected to them.

4. The combination with the actuating mechanism of an electrical measuring instrument, of a transformer, a secondary winding of said transformer being connected in circuit with an actuating element of said mechanism, and a plurality of individual primary coils on said transformer, one of said primary coils being a current coil for use in measurement of current up to a certain range and another of said coils being for use in measurement of current up to a different range, and the ampere turns of said two coils being the same when the currents of the maximum values of the ranges are passed through said coils respectively.

5. The combination with the actuating mechanism of an electrical measuring instrument, of a transformer, a secondary winding of said transformer being connected in circuit with an actuating element of said mechanism, and a plurality of individual primary coils on said transformer, one of said primary coils being a potential coil adapted for use in measurement of voltage up to a certain range and another of said primary coils being a potential coil adapted for use in voltage up to a different range, said two coils having the same ampere turns when the maximum values of the ranges for which the coils are adapted are applied to said two coils respectively.

6. The combination with the actuating mechanism of a measuring instrument, of a transformer, a plurality of secondary coils connected in circuit with an actuating element of said mechanism, and a plurality of primary coils on said transformer adapted for the measurement of currents over different ranges, each of said primary coils being related to said secondary coils to have substantially the same resultant magnetic leakage when said coils have the same exciting ampere turns respectively.

7. The combination with the actuating mechanism of a measuring instrument, of a transformer, a plurality of secondary coils connected in circuit with an actuating element of said mechanism, and a plurality of primary coils on said transformer adapted for the measurement of voltages over different ranges, each of said primary coils being related to said secondary coils to have substantially the same resultant magnetic leakage when said coils have the same exciting ampere turns respectively.

8. The combination with the actuating mechanism of a measuring instrument, of a transformer, a plurality of secondary coils connected in circuit with an actuating element of said mechanism, and a plurality of primary coils on said transformer adapted for the measurement of current and voltage respectively, each of said primary coils being related to said secondary coils to have substantially the same resultant magnetic leakage when the exciting ampere turns in each of said primary coils are the same.

9. The combination with the actuating mechanism of a measuring instrument having an indicator, a single reading scale, and a transformer having a secondary winding in circuit with an actuating element of said mechanism, and a plurality of primary coils on said transformer, said primary coils being adapted to be connected individually to an external circuit for measurement of current or voltage, or for either current or voltages over different ranges while utilizing the same reading scale in each case.

In testimony whereof I affix my signature, in presence of two witnesses.

FRANK W. ROLLER.

Witnesses:
　MARGOT D. ISREL,
　G. N. KERR.

Correction in Letters Patent No. 1,126,286.

It is hereby certified that in Letters Patent No. 1,126,286, granted January 26, 1915, upon the application of Frank W. Roller, of East Orange, New Jersey, for an improvement in "Alternate-Current-Measuring Instruments," an error appears in the printed specification requiring correction as follows: Page 1, after line 76, insert the words *number of lines of magnetic force must pass;* and that the said Letters Patent should be read with this correction therein that the same may conform to the record of the case in the Patent Office.

Signed and sealed this 9th day of March, A. D , 1915.

[SEAL.]

J. T. NEWTON,

*Acting Commissioner of Patents.*